Nov. 3, 1931. A. P. LEE 1,830,608
MOTOR LIFT DUMPING BODY
Filed May 28, 1928 3 Sheets-Sheet 1
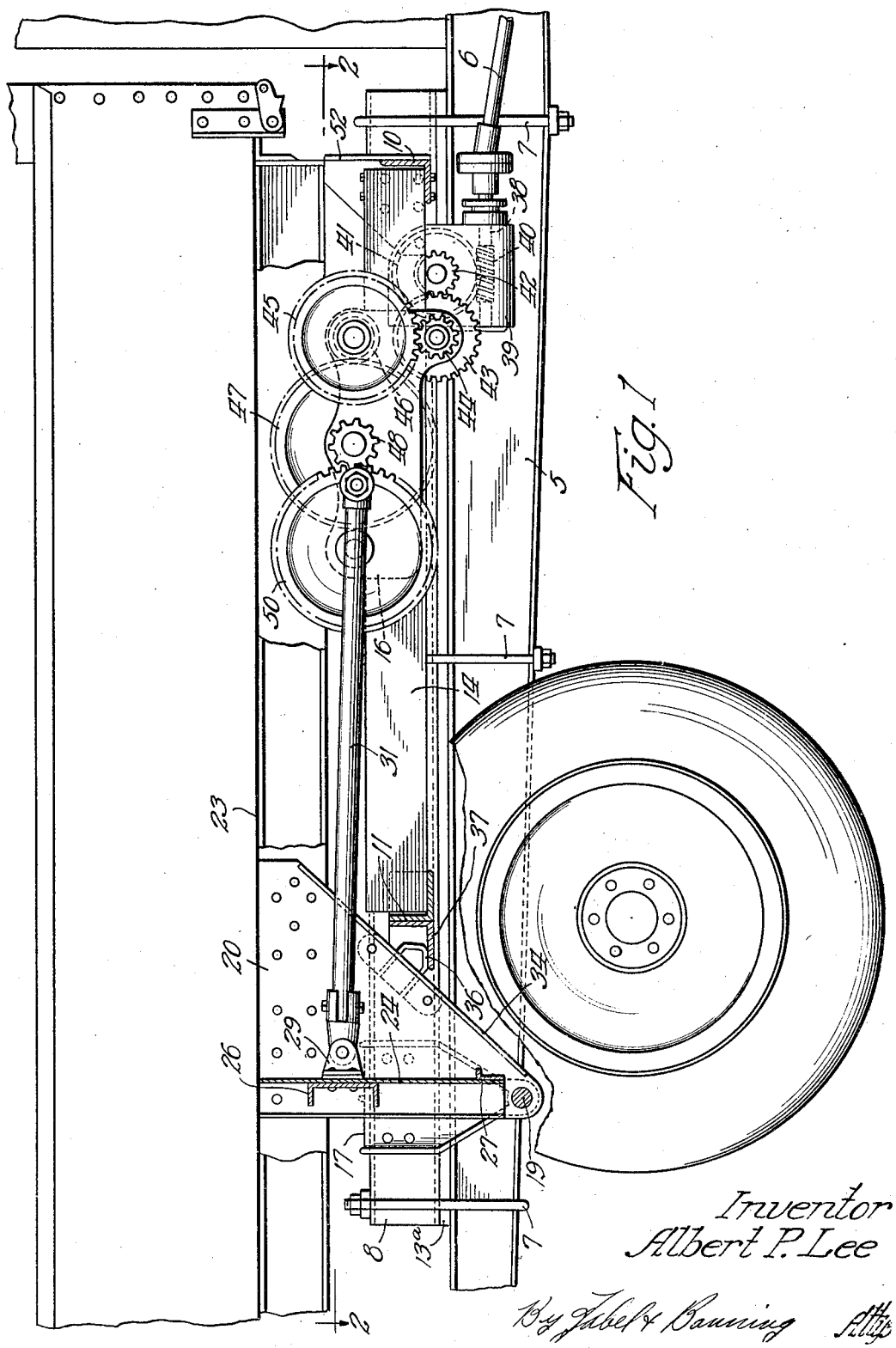
Inventor
Albert P. Lee

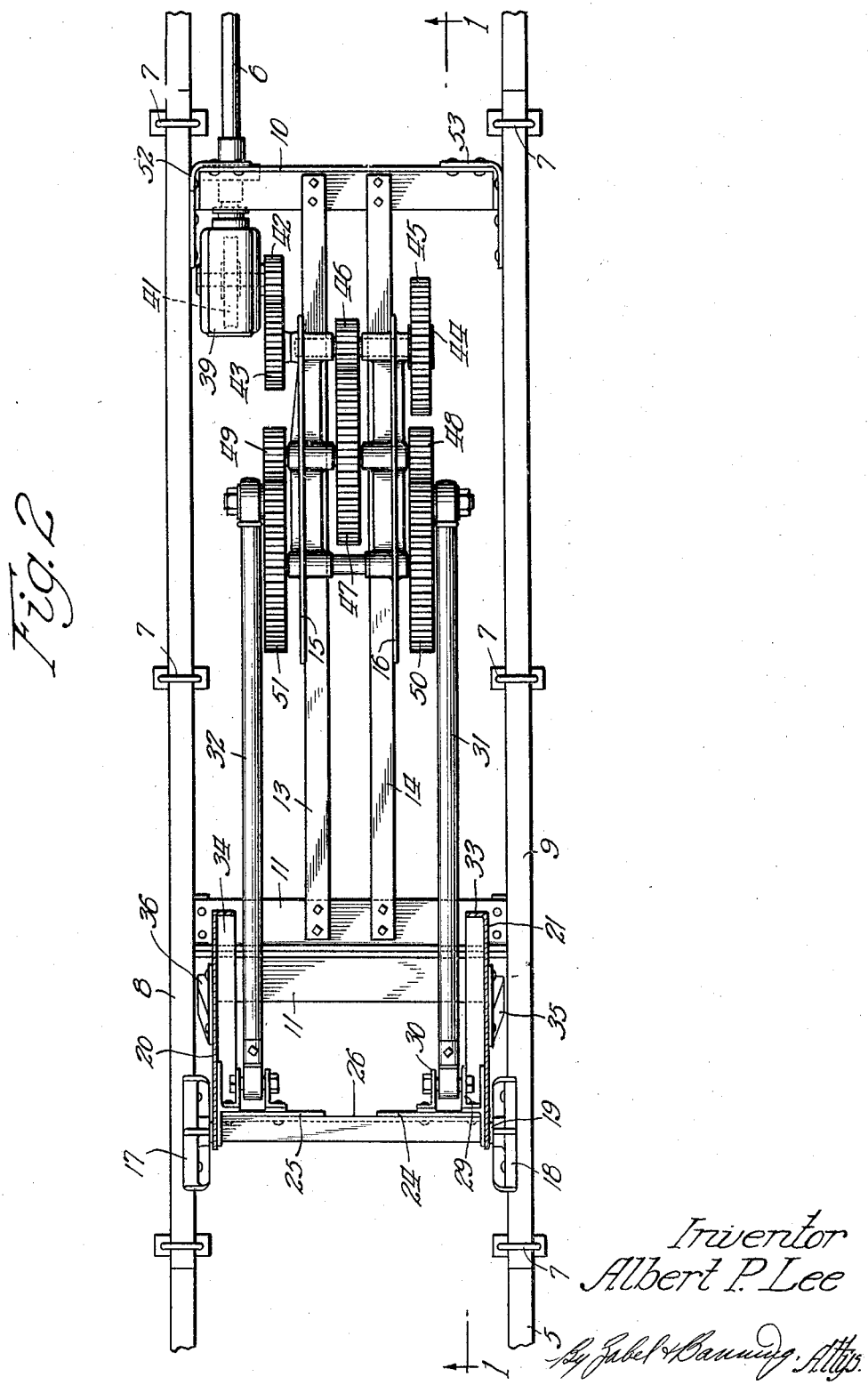

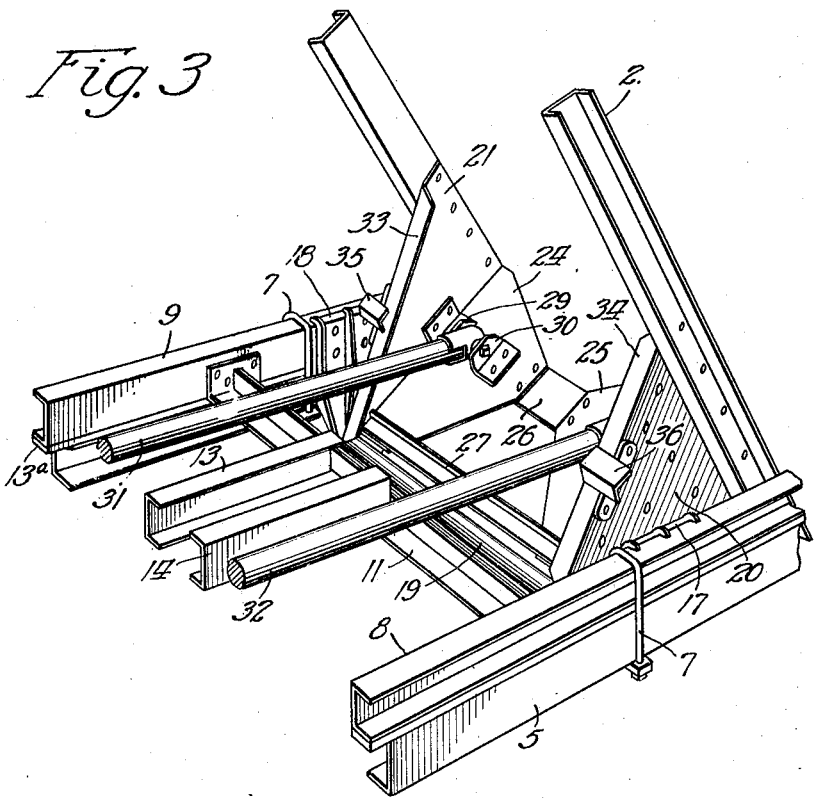

Patented Nov. 3, 1931

1,830,608

UNITED STATES PATENT OFFICE

ALBERT P. LEE, OF PLYMOUTH, INDIANA, ASSIGNOR TO LEE TRAILER & BODY COMPANY, OF PLYMOUTH, INDIANA, A CORPORATION OF ILLINOIS

MOTOR LIFT DUMPING BODY

Application filed May 28, 1928. Serial No. 281,268.

My invention relates to dumping bodies for trucks and the like and has for its particular object to provide a device of this character which can be readily attached to the truck chassis without in any way modifying the same and which can be connected to a power take off of the motor of the truck and operated by the continuous rotation of the power take off in the same direction to both move the dumping body to dumping position and to return it to a position of rest.

Another object of this invention is to provide a device of this character wherein all of the dumping mechanism including the pivots at the rear of the dump body are supported and assembled upon an auxiliary framework independent of the chassis of the vehicle upon which the device is to be used and which may be attached to the vehicle by simply connecting the auxiliary frame to the chassis of vehicle.

In carrying out my invention any suitable type of power take off may be used although I prefer to use a single speed non-reversible type controlled from a lever at the driver's seat.

The hoisting or dumping mechanism utilized for dumping the body consists of a worm and gear connection between the power take off shaft and the train of gears which are in turn connected by means of crank arms to the rear supporting arms which are carried by an auxiliary frame.

A train of gears is constructed in such a manner and so connected to the dumping body as to give the maximum lifting power at the time the dumping body is started from its resting position on the truck toward dumping position and at the time the body starts on its return from dumping position to normal resting position. The purpose of this is to obtain a slow positive movement at both ends of the dumping action where the strain is the greatest to eliminate the possibility of undue shock or strain upon the hoisting mechanism from the power take off.

Other and more specific objects and advantages of the invention will appear as the description proceeds in connection with the accompanying drawings. However, it is to be distinctly understood that I do not intend to limit myself to the exact details shown and described, but that I intend to avail myself of all such modifications as would occur to one skilled in this art and as fall within the scope of the claims.

In the drawings:

Fig. 1 is a side view partly in section of my improved device;

Fig. 2 is a plan view illustrating the train of gears and the auxiliary framework, the dumping body being cut away; and Fig. 3 is a perspective view illustrating the mounting of the dumping body on the auxiliary framework.

Referring now in detail to the drawings, the numeral 5 represents generally the chassis or framework of the vehicle to which the dumping body is to be attached. The numeral 6 is a power take off shaft which is preferably to be controlled in the manner above set forth, that is, by a lever located in the driver's compartment of the truck. Secured upon the chassis 5 by means of a series of U bolts 7 is an auxiliary frame consisting of the steel channels 8 and 9 which are braced together by means of the angle bars 10 and 11 riveted in position to form a rigid framework. Intermediate the auxiliary frame channels and the chassis of the vehicle there is placed a wooden strip 13a underneath each channel so that, when the U bolts are drawn up tight, this wooden piece 13a will serve to take up any unevenness in either the channel or chassis frame.

The auxiliary framework provides a support for a train of gears which will now be described.

A plurality of smaller channel beams 13 and 14 extend lengthwise between the angle irons 10 and 11 and are rigidly riveted or bolted to these angle irons substantially midway between the channels 8 and 9. Bearing members 15 and 16 having suitable bores therein for the gear shafts are bolted on to the channel beams 13 and 14.

To the rear of the angle bars 11 a plurality of brackets 17 and 18 are secured to the channels 8 and 9 respectively as by riveting and have their top portions extending over the channels to form a strong connection. These bracket members at their lower ends are provided with bearings for a shaft 19 on which the arms 20 and 21 are mounted. The arms 20 and 21 as shown are substantially triangular shaped steel plates which are riveted to the framework 22 of the dumping body 23. Braces 24 and 25 are riveted to the arms 20 and 21 and extend toward each other between the arms and are connected together as by means of the channel beam 26 which is firmly riveted to them. Also adjacent the pivot points of the arms 20 and 21 an angle iron 27 connects the members 24 and 25 so as to brace them at this point.

Brackets such as 29 and 30 on each of the members 24 and 25 form means by which the connecting rods 31 and 32 may be pivotally connected to the members 24 and 25. This connection is preferably made some distance below the body frame in order that the required throw or movement of the body may be obtained with the limited lengthwise movement of the connecting rods 31 and 32.

The forward sloping edges of the arms 20 and 21 have inwardly turned flanges 33 and 34 upon which are mounted the supporting brackets 35 and 36 which rest upon the rear flat portion 37 of the angle iron 11 when the body is in loading or normal position. These brackets 35 and 36 serve to take the strain off the shaft 19 to which the arms 20 and 21 are pivoted while the body is being loaded.

The gear connection from the power take off shaft 6 will now be described.

This shaft connects with the worm shaft 38 which is journalled in the housing 39 and may be filled with oil or other suitable lubricant and which carries a worm 40 engaging a worm gear 41 also journalled in the housing member 39. The shaft of the worm gear 41 extends through the housing and is provided on the outside of the housing with a pinion 42 engaging a gear 43, the shaft of which is journalled in the bearing members 15 and 16 and carries at its opposite end a pinion 44. Pinion 44 meshes with gear 45, the shaft of which is also journalled in the bearing members 15 and 16, and carries between the members 15 and 16 a pinion 46. Pinion 46 in turn engages drive gear 47 which has the pinions 48 and 49 on its shaft and pinions 48 and 49 are geared to the large gears 50 and 51 respectively to which gears the connecting rods 31 and 32 are eccentrically connected.

Now when the shaft 6 is rotated by means of the power take off device on the motor, the chain of gears will be driven and the connecting rods 31 and 32 will, during the initial movement from the position shown in Fig. 1, start the body on its movement toward dumping position. As is clear from Fig. 1, the initial rotation of the chain of gears causes very little rearward movement of the connecting rods at first, but the rearward movement gradually increases during the first quarter rotation of the gears 50 and 51. Thus the maximum power is obtained at the time when the greatest force is necessary to move the dumping body toward dumping position. As this first movement is principally a lifting movement of the load in the dumping body, this is highly essential in obtaining the best results in dumping. As the dumping body moves from loading to dumping position, the speed gradually increases until the body is substantially half way between loading position and the extreme dumping position. At this time since the arms 20 and 21 are mounted somewhat forward at the rear of the dumping body, the center of gravity of the load has been lifted to the rear a sufficient amount that the further movement requires much less force. As the body then moves into extreme dumping position as shown in Fig. 3, the rearward movement of the connecting rods 31 and 32 gradually decreases in speed and this serves as a brake to prevent too sudden dumping of the load. The chain of gears effectively prevents the tendency of the load to cause a high speed of rotation.

As the shaft 6 continues to rotate the gears 50 and 51 through the chain of connecting gears, the body will be returned from dumping position gradually at first and then at a higher speed during the intermediate stages and then again slowly to loading position, thus avoiding any sudden jars or shocks on the mechanism at the time when the direction of movement of the dumping body is changing. No reversing mechanism is necessary in this device since the continuous rotation of the gears in the one direction not only dumps the body but returns it to loading position.

Also, the use of this train of gears in this manner and the suspension brackets at the rear upon which the dumping body is pivoted permit the dumping body to be placed low down upon the main body so as to avoid excessive height while at the same time all of the advantages of the large dumping angle are maintained. This dumping structure is designed to have a maximum dumping angle of approximately forty five degrees to the horizontal which is sufficient to cause proper dumping of the loads in the body.

At the front end of the auxiliary frame the upstanding brackets 52 and 53 are adapted to engage the framework 22 of the body and support the forward end thereof in loading position.

From the above description it is thought the construction and operation of this device will be clear to those skilled in this art and having thus described my invention what I claim as new and desire to secure by Letters Patent is:

1. A dump body construction for vehicles comprising an auxiliary framework adapted for mounting upon a vehicle chassis, a dumping body, brackets suspended from said framework adjacent the rear end thereof, supporting arms pivoted to said brackets at their lower ends and rigidly secured to said body, cooperating means on said arms and framework for relieving the pivotal connection between said arms and brackets of strain when said body is in loading position, longitudinally extending connecting links secured to said arms, and a train of gears carried by said framework and connected to said links whereby rotation of said gears continuously in one direction moves said body from loading position to dumping position and back to loading position.

2. A dump body construction for vehicles comprising an auxiliary framework adapted for mounting upon a vehicle chassis, a dumping body, brackets suspended from said framework adjacent the rear end thereof, supporting arms pivoted to said brackets at their lower ends and rigidly secured to said body, bracing means connecting said arms, longitudinally extending connecting links secured to said means and a train of gears carried by said framework and connected to said links whereby rotation of said gears continuously in one direction moves said body from loading position to dumping position and back to loading position.

3. A dump body construction for vehicles comprising an auxiliary framework adapted for mounting upon a vehicle chassis, a dumping body, brackets suspended from said framework adjacent the rear end thereof, supporting arms pivoted to said brackets at their lower ends and rigidly secured to said body, bracing means connecting said arms, longitudinally extending connecting links secured to said means, auxiliary supporting means on said arms and framework forwardly of the pivots of said arms, and a train of gears carried by said framework and connected to said links whereby rotation of said gears continuously in one direction moves said body from loading position to dumping position and back to loading position.

4. In a dumping vehicle, an auxiliary framework rigidly mounted on the vehicle chassis, a dumping body, arms supporting said body pivotally mounted on said auxiliary framework adjacent the rear end thereof, bracing means connecting said arms below said body, and means for swinging said body on its pivots comprising crank and gear means rotatably mounted on said framework and a link connecting said means with said bracing means, said crank and gear means being rotatable in the same direction to dump said body and return the same to load carrying position.

5. A dumping body construction adapted to be mounted on a vehicle chassis without modifying the chassis, comprising a framework having means whereby the same may be bolted down upon the chassis, a dumping body, brackets suspended from the rear end of said framework, supporting arms on said dump body pivoted to said brackets at their lower ends, crank and gear means carried by said framework at its forward end, and a rigid link connecting said arms with said means, said framework and arms being provided with auxiliary supporting means forwardly of said brackets.

6. A dumping body construction adapted to be mounted on a vehicle chassis without modifying the chassis, comprising a framework having means whereby the same may be bolted down upon the chassis, a dumping body, brackets suspended from the rear end of said framework, supporting arms on said dump body pivoted to said brackets at their lower ends, a brace rigidly connecting said arms intermediate the body and the pivoted ends thereof, and body elevating and lowering means including a rigid link pivotally connected with said brace.

7. In a dumping truck the combination of a vehicle chassis, a dumping body, depending members connected with the dumping body, means supporting said members for movement at their lower ends upon the chassis so that the dumping body may be moved to dumping or loading positions, a cross brace construction between said depending members, and means for swinging said body upon the chassis including a link connected with said cross brace construction between said depending members.

In witness whereof, I hereunto subscribe my name this 22nd day of May, A. D. 1928.
ALBERT P. LEE.